Figure 1:
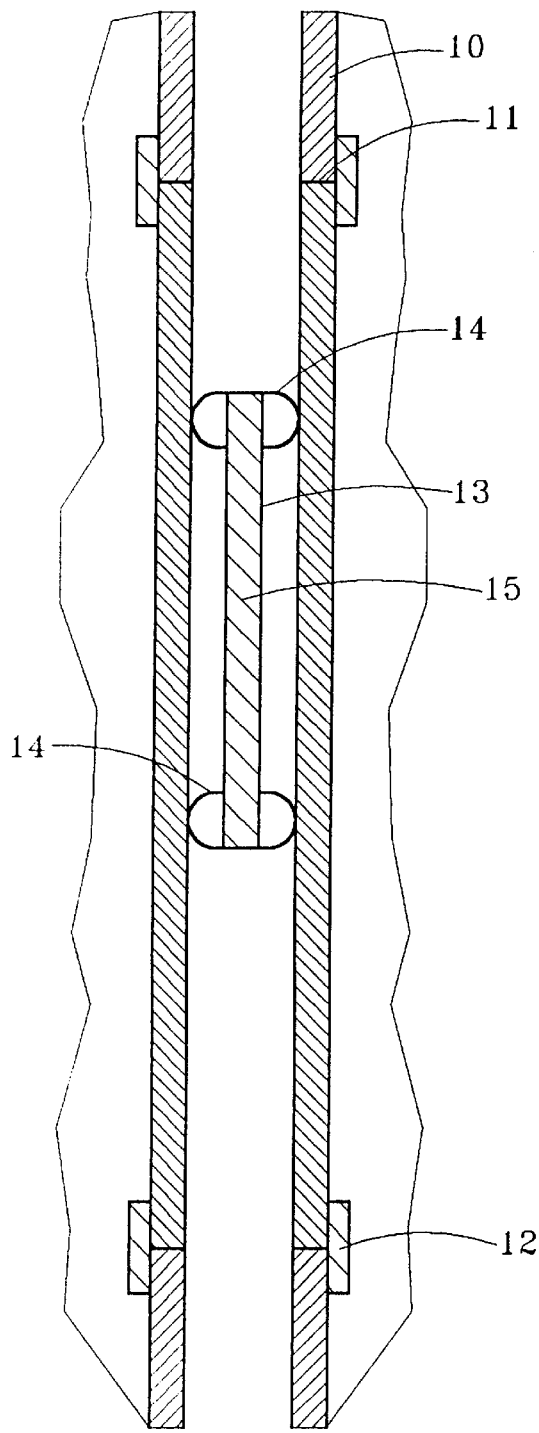

United States Patent
McRobbie et al.

[11] Patent Number: 6,145,378
[45] Date of Patent: Nov. 14, 2000

[54] AIDED INERTIAL NAVIGATION SYSTEM

[75] Inventors: David P. McRobbie, Aberdeen; John L. Weston, Bridgwater, both of United Kingdom

[73] Assignee: Baroid Technology, Inc., Houston, Tex.

[21] Appl. No.: 09/120,652

[22] Filed: Jul. 22, 1998

[30] Foreign Application Priority Data

Jul. 22, 1997 [GB] United Kingdom .................... 9715287

[51] Int. Cl.⁷ .............................. G01C 9/06; E21B 47/02; G01B 7/28
[52] U.S. Cl. ..................... 73/490; 73/152.46; 73/152.56; 73/503.3; 73/865.8; 166/254.1; 166/255.2; 175/45; 324/221
[58] Field of Search ............................ 73/152.54, 152.56, 73/152.46, 490, 503.3, 865.8; 166/254.1, 254.2, 255.1, 255.2; 175/45; 324/221

[56] References Cited

U.S. PATENT DOCUMENTS

| | | | |
|---|---|---|---|
| 4,717,875 | 1/1988 | Lara | 73/152.54 |
| 4,799,391 | 1/1989 | Lara | 73/865.8 |
| 4,835,876 | 6/1989 | Petermann et al. | 33/313 |
| 4,945,775 | 8/1990 | Adams et al. | 73/865.8 |
| 5,385,049 | 1/1995 | Hunt et al. | 73/866.5 |

FOREIGN PATENT DOCUMENTS

| | | | |
|---|---|---|---|
| 2 195 023 | 3/1988 | United Kingdom | E21B 47/022 |
| 2 211 994 | 7/1989 | United Kingdom | H01H 36/00 |

*Primary Examiner*—Hezron Williams
*Assistant Examiner*—J. David Wiggins
*Attorney, Agent, or Firm*—Browning Bushman

[57] ABSTRACT

The invention relates particularly to sensing devices and techniques which may be used to provide measurement data to aid an inertial navigation system, or attitude and heading reference system, and so bound the growth of errors which increase with time in such systems when operating autonomously. In one aspect, the invention relates to a method of determining the path length along a borehole from a known reference point to a probe or tool which progresses through a drillpipe or tubular string, to provide data to aid an inertial navigation system. A sensing device 15 is used to detect joints 11 between sections of drillpipe or tubular string within the borehole and the path length is determined from the number of joints detected and a known length of each section of drillpipe or tubular string. In another aspect, a flow measuring device, such as an impeller, is used to measure the velocity of the probe or tool through the drillpipe or tubular string. In another aspect the invention relates to a method of determining the velocity of a probe or a tool moving through a drillpipe or tubular string to provide data to aid an inertial navigation system. Two sensing devices, which are spaced apart by a known distance on the probe or tool, are used to detect one or more positions within a drillpipe or tubular string, and the velocity of the probe or tool is determined from the elapsed time between each sensor detection of the or each position and the distance between the sensors.

13 Claims, 6 Drawing Sheets

AIDED INERTIAL NAVIGATION SYSTEM

This invention relates to improvements in or relating to methods and apparatus for the precise and continuous determination of the trajectory of underground boreholes using aided inertial navigation systems. The invention relates more particularly to sensing devices and techniques which may be used to provide measurement data to aid an inertial navigation system, or attitude and heading reference system, and so bound the growth of errors which increase with time in such systems when operating autonomously.

Most of the directional borehole survey systems currently used for geological survey, mining and the drilling of oil and gas wells derive the path or trajectory of a borehole by determining its inclination and azimuth angles with respect to a prescribed co-ordinate reference frame, often defined by the local vertical and the direction of a north reference, at intervals along the borehole. For instance, inclination may be defined using measurements provided by accelerometers whilst azimuth may be determined using-a north seeking gyroscope installed in a probe or tool which can be lowered or raised in the hole on the end of a cable or conductor wireline. The angular information is then combined with measurements of the distance moved along the borehole, such information being derived by measuring the length of the cable extending into the hole. Cable length may be correlated with magnetic marks encrypted on the armour of the cable at known intervals along its length. The measurements of inclination, azimuth and cable length obtained at each location are then processed to obtain estimates of position with respect to the chosen reference frame (typically north, east and down in a local geographic reference frame for instance).

More recent developments have been directed towards the application of full inertial navigation systems mounted in the probe, capable of providing "continuous" estimates of borehole position and angular orientation of the hole as the probe moves through it. Such systems also use gyroscopes and accelerometers, typically three of each, mounted with their sensitive axes mutually perpendicular to one another. The gyroscopes determine the angular motion of the probe from which its attitude relative to the reference frame may be derived, whilst the accelerometers measure the non-gravitational components of probe acceleration. The attitude information provided by the gyroscopes is used to resolve the accelerometer measurements into the designated reference frame. The resolved acceleration measurements are compensated in order to take into account the gravitational attraction of the Earth before being integrated twice with respect to time to generate estimates of probe velocity and position with respect to the reference frame.

Inertial navigation system configurations may be classified under two major headings; platform or strapdown systems. In the former category, the inertial sensors (gyroscopes and accelerometers) are mounted on a stabilised platform so de-coupling the sensors from any rotational motion of the vehicle or probe in which they are installed and allowing gyroscopes with a relatively low dynamic range to be used. In strapdown configurations, the inertial sensors are attached rigidly (or via shock isolation mounts) to the vehicle causing the gyroscopes to be subjected to the maximum turn rates of the vehicle. Therefore, gyroscopes used in strapdown systems require a much larger dynamic range. In strapdown systems, the mechanical complexity of platform systems (the mechanical gimbal structure which supports the stable platform allowing its isolation from the angular motion of the vehicle and the associated components—slip rings, resolvers and torque motors) is discarded at the expense of a substantial increase in computational complexity.

Whilst an on-board inertial navigation system (INS) is capable of providing estimates of probe position, velocity and attitude which are accurate in the short term, errors in these estimates drift or increase with time due mainly to imperfections in the inertial sensors and system errors. Whilst such effects may be minimised through the use of more accurate inertial sensors, assuming the required grade of sensor is available, and precise calibration of the sensors can be achieved, the cost penalties incurred soon become prohibitive, particularly to satisfy the accuracy requirements sought for borehole surveying applications. An alternative, and commonly used, method of overcoming such limitations is to operate an INS in conjunction with another navigation sensor or system, ideally one which has performance characteristics complementary to those of the INS, i.e. a sensor with good long term stability, but which is perhaps only capable of providing intermittent survey updates. For example, for systems operating on or above the surface of the Earth, improved navigation accuracy may be achieved through the use of a position fixing navigation aid, such as GPS satellite updates, thus enabling the drift errors in the IN system to be bounded.

This approach usually provides a less costly alternative to the use of an unaided IN system with higher grade inertial sensors whilst the judicious combination of the two sources of information usually enables the resulting navigational data to be more accurate than that provided by either of the contributing systems when operated in isolation. The two sources of navigational information are combined using a filtering process, the filter being based upon a statistical error model of the INS and, in some applications, a model of the navigation aid as well. The manner in which the various sources of error propagate within an INS is well understood thereby allowing a representative dynamic model of the INS error propagation processes to be incorporated into the filter. A closed loop process is usually implemented which seeks to minimise the difference between the INS and aid measurements and predictions of this measurement difference derived from the error model(s). A particular, and often used, manifestation of this-filtering process, is known as Kalman filtering, in which the filter feedback gains are selected in an optimal manner with a view to minimising the covariances of the error differences.

For systems operating underground, such as borehole navigation systems, the options for INS aiding are somewhat limited. One possible method for aiding a probe mounted INS involves stopping the probe periodically during its descent/ascent in the borehole. Whilst the probe is stationary, any components of velocity indicated by the on-board INS are clearly error signals which can be used to update the INS velocity estimates and to form estimates of various errors in the system and in the measurements provided by the inertial sensors. Further schemes have been disclosed in which inertial navigation systems are aided using measurements of depth (cable length) using a Kalman filter.

The invention relates generally to the survey of boreholes in which the survey probe or tool is lowered on a cable or conducting wireline or where it is fixed or seated within the drillstring bottom hole assembly and used to provide a survey as the drill bit is lowered or raised in the hole, a process usually referred to as 'tripping' in or out of hole. Alternatively, and very specifically, the invention may relate to applications in which the tool is dropped and allowed to fall freely within drillpipe in a previously tripped in hole, a process referred to as 'go-devil' operation.

According to a first aspect of the invention there is provided a method of determining the path length along a borehole from a known reference point to a probe or tool which progresses through a drillpipe or tubular string, to provide data to aid an inertial-navigation system, comprising the steps of:

(a) using a sensing device to detect joints between sections of drillpipe or tubular string within the borehole, and (b) determining said path length from the number of joints detected and a known length of each section of drillpipe or tubular string.

According to a second aspect of the invention there is provided a method of determining the velocity of a probe or a tool moving through a drillpipe or tubular string to provide data to aid an inertial navigation system, comprising the steps of:

(a) using at least two sensing devices, which are spaced apart by a known distance on the probe or tool, to detect one or more positions within a drillpipe or tubular string, and (b) determining the velocity of the probe or tool from the elapsed time between each sensor detection of the or each position and the distance between the sensors.

Preferably, the location of the or each position detected within the borehole is defined by a joint between sections of drillpipe or tubular string within the borehole. Alternatively, the sensors could be pressure sensors which detect positions of the same pressure.

According to a third aspect of the invention there is provided a method of determining the velocity of a probe or tool moving through a drillpipe or tubular string, to provide data to aid an inertial navigation system, comprising the step of using a flow measuring device to measure the velocity of by the probe or tool through the drillpipe or tubular string.

The flow measuring device may be an impeller.

The data representative of path length or velocity can be combined with data provided by an inertial navigation system using a filter, typically a Kalman filter, to reduce the errors in the data provided by the inertial navigation system.

According to a fourth aspect of the present invention there is provided borehole survey apparatus comprising an inertial navigation system, within a probe or tool, for providing data representative of probe position, velocity and attitude, a sensing device for detecting joints between sections of drillpipe or tubular string within the borehole, means for determining the path length along the borehole from a known reference point to the probe or tool from the number of joints detected by the sensing device and a known length of each section of drillpipe or tubular string, and a filter for combining the data provided by the inertial navigation system and the aforesaid path length to reduce the errors in the data provided by the inertial navigation system.

According to a fifth aspect of the present invention there is provided borehole survey apparatus comprising an inertial navigation system, within a probe or tool, for providing data representative of probe position, velocity and attitude, at least two sensing devices which are spaced apart by a known distance on the probe or tool, to detect one or more positions within the borehole, means for determining the velocity of the probe or tool string from the time elapsed between the two sensors detecting the location of each position and the distance between the sensors, and a filter for combining the data provided by the inertial navigation system and the aforesaid velocity to reduce the errors in the data provided by the inertial navigation system.

According to a sixth aspect of the invention there is provided borehole survey apparatus comprising an inertial navigation system, within a probe or tool, for providing data representative of probe position, velocity and attitude, a flow measuring device for measuring the velocity the probe or tool through the drillpipe or tubular string within the borehole, and a filter for combining the date provided by the inertial navigation system and the aforesaid velocity to reduce the errors in the data provided by the inertial navigation system.

The filter of the fourth, fifth and sixth aspects of the invention may be a Kalman filter.

Figure 3:
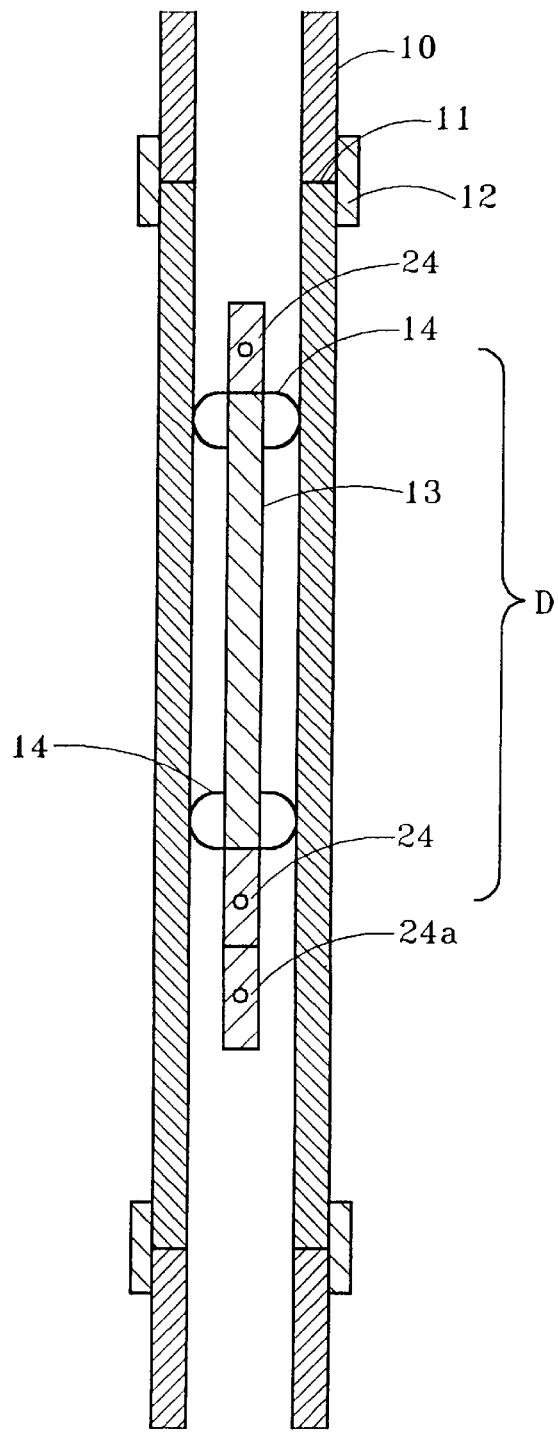
Figure 2:
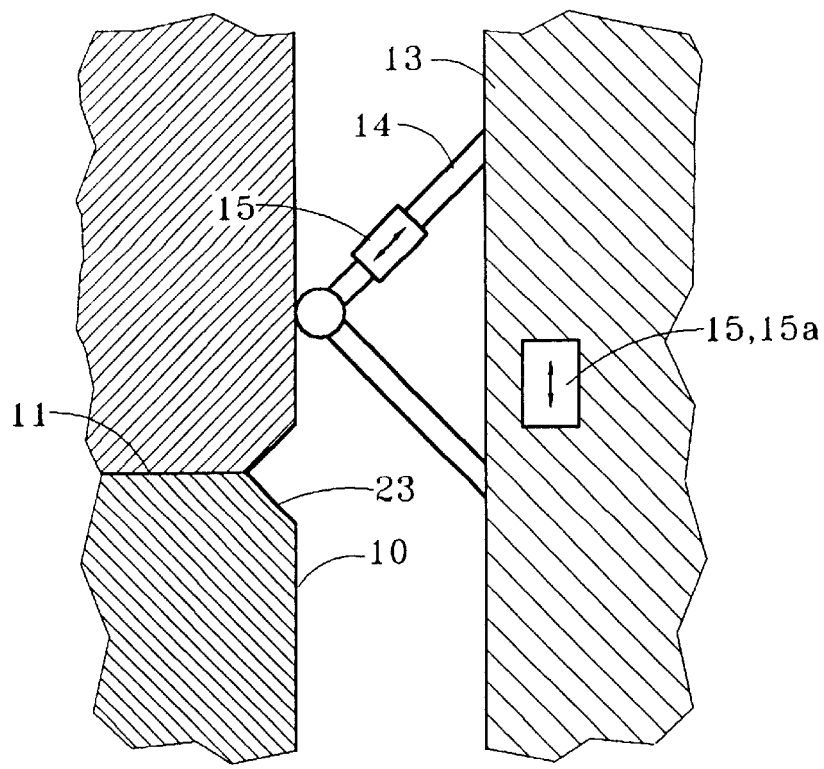
Figure 4:
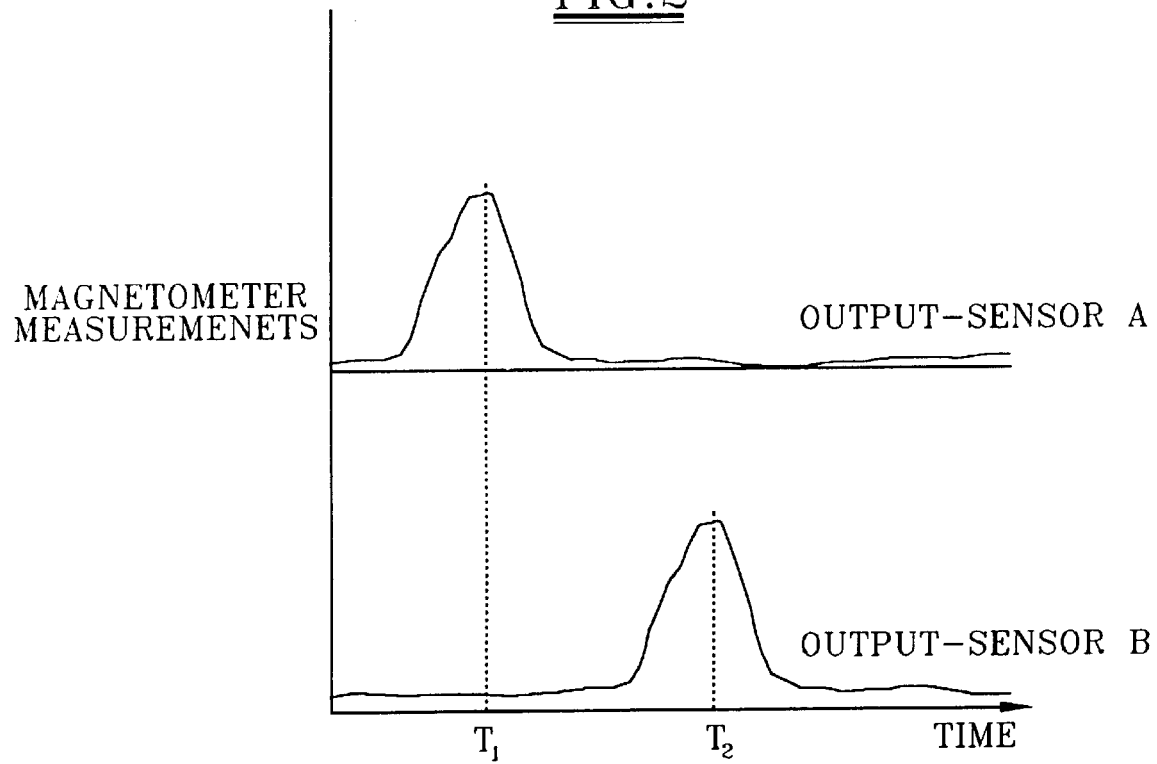
Figure 5:
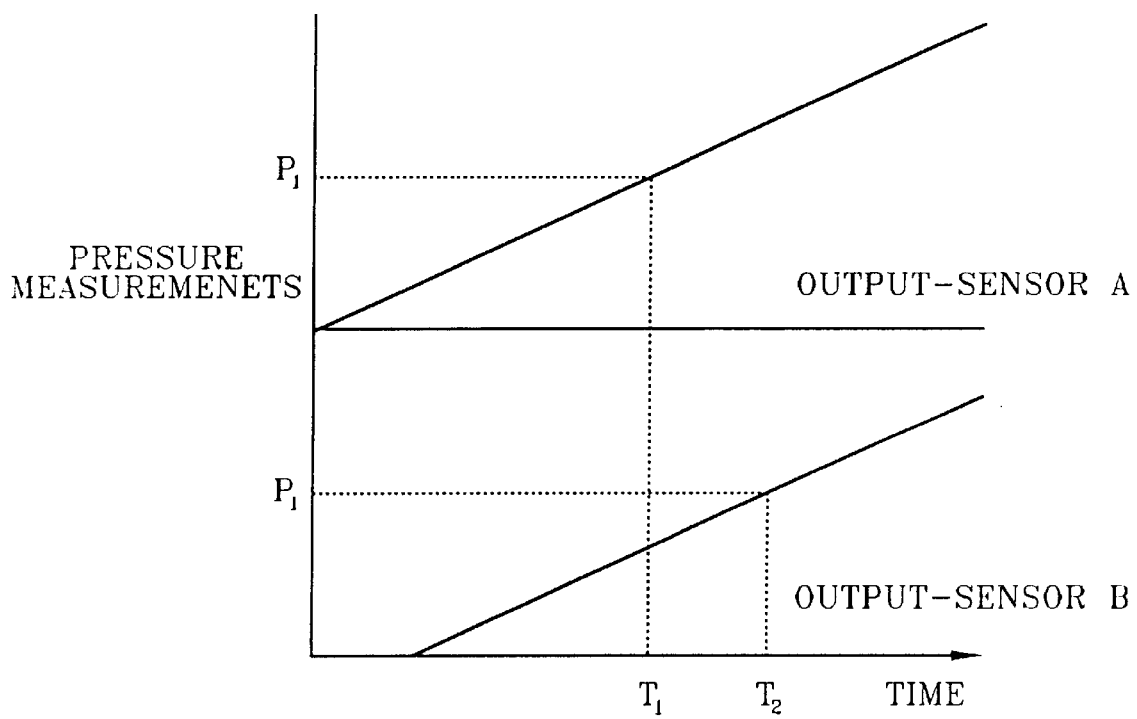
Figure 6:
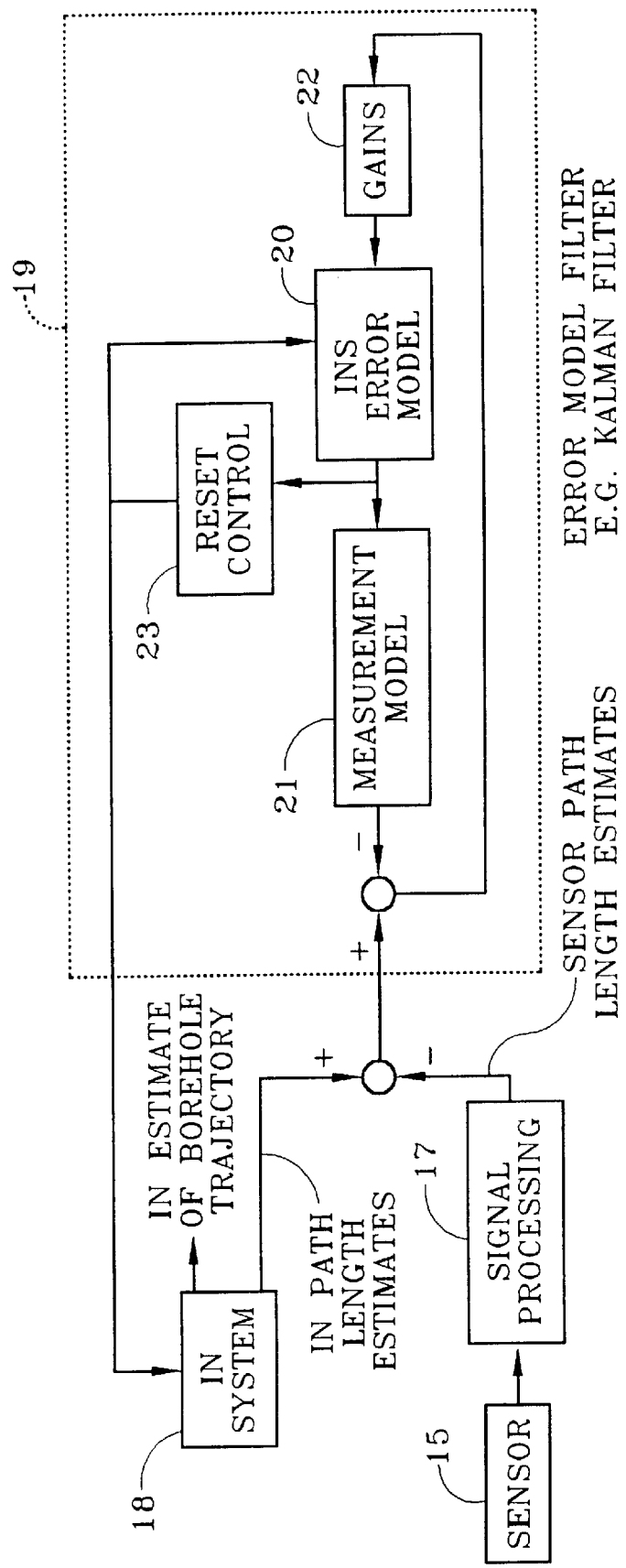
Figure 7:
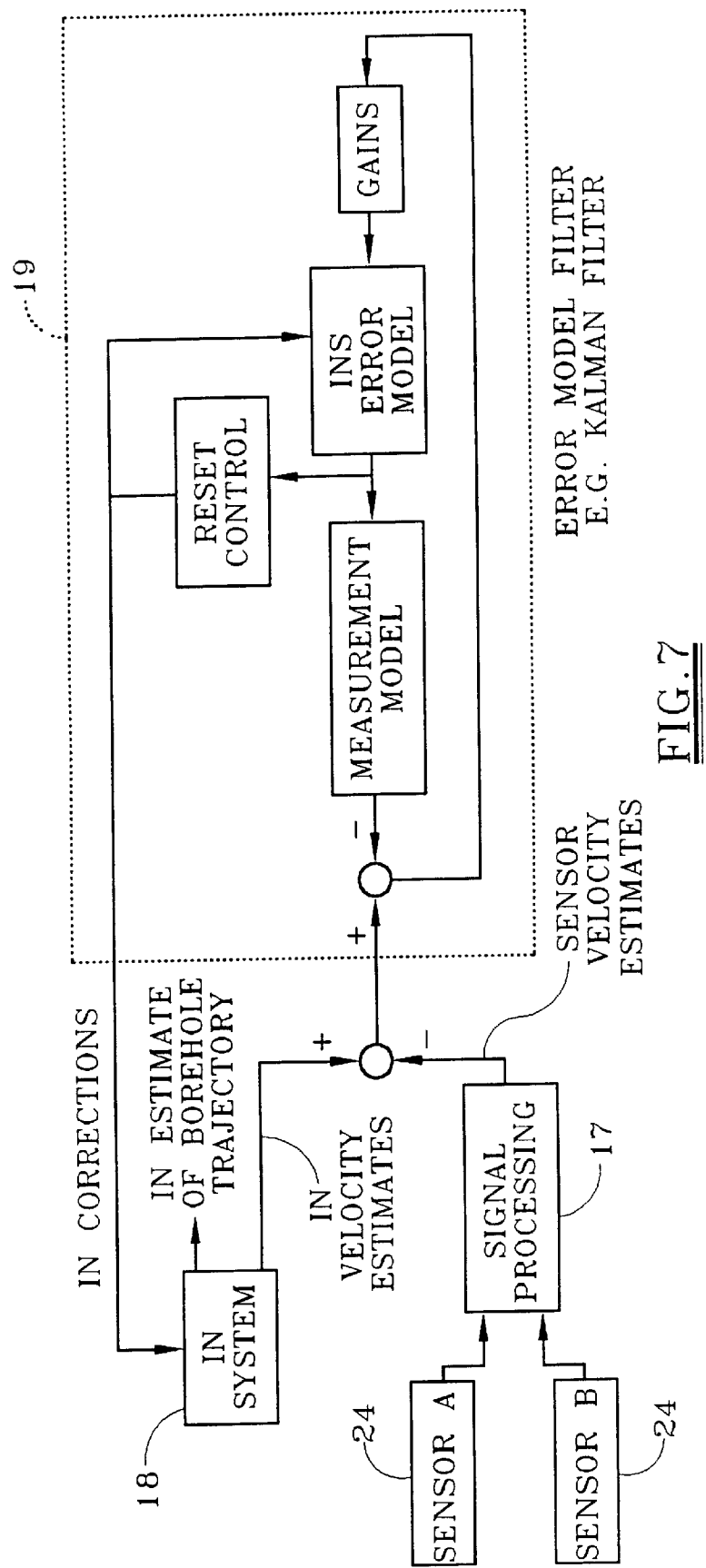

The invention will now be more particularly described, by way of example, with reference to the accompanying drawings, in which:

FIG. 1 is a sectional view showing a probe in a drillpipe or tubular string within a borehole, FIG. 2 is a fragmentary sectional view showing part of the probe of FIG. 1 in more detail, FIG. 3 is a sectional view showing another probe, equipped with two or more spaced apart sensors, in a drillpipe or tubular string, FIG. 4 shows typical output signals of the two sensors mounted on the probe of FIG. 3, FIG. 5 shows typical output signals o two alternative sensors, such as pressure sensors, mounted on the probe of FIG. 4, FIG. 6 is a block diagram of a typical circuit used in conjunction with a probe equipped with a single position sensor, and FIG. 7 is a block diagram of a typical circuit used in conjunction with a probe equipped with two sensors spaced apart capable of measuring the velocity of the probe.

Figure 8:
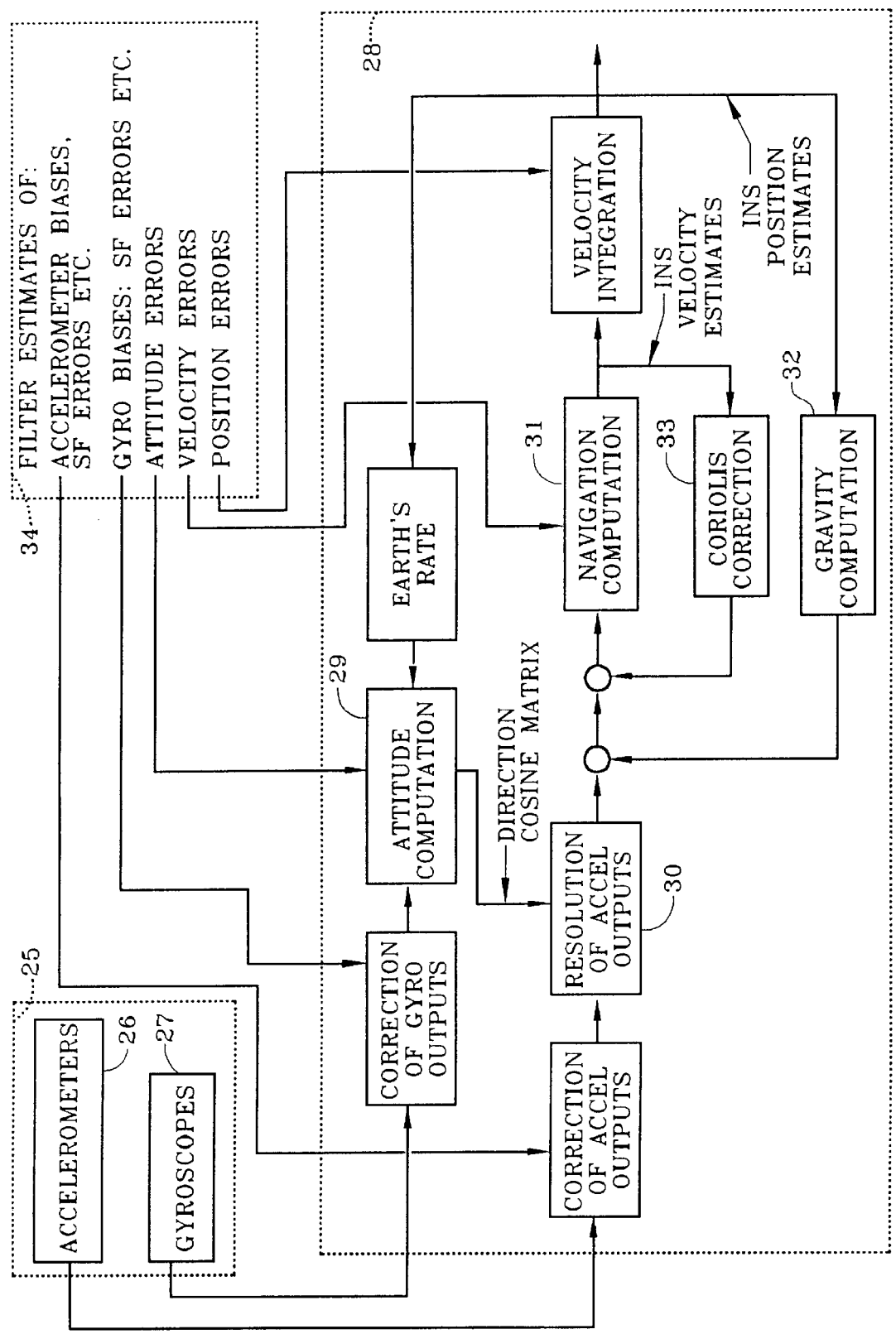

FIG. 8 is a block diagram of a typical inertial navigation system showing the major components and computational blocks of such a system and the application of correction terms at various modes or states in the inertial computational chain to correct or re-set those computational states.

Referring firstly to FIGS. 1 and 2 of the drawings, there is shown therein a tubular string 10 within a borehole. The tubular string 10 is formed by linking steel pipe sections of known fixed length or pre-measured fixed length to form a continuous tube. Joints between the sections of steel pipe or tubing are shown by the reference numeral 11. External collars 12 may be present depending on the specific joint design. The tubular string 10 could alternatively be a drillpipe.

A survey probe 13 is centralised within the tubular string 10. Arms 14 of a centralisation device centralise the probe as it moves up and down the borehole. A sensor in the form of an accelerometer 15 is mounted within the probe to detect physical discontinuities in the tubular at the joints 11. These discontinuities will subject the probe 13 to a disturbance which will be detected by and the accelerometer 15.

It is thus possible to determine the path length along the borehole from a known reference point to the probe 13 from the number of joints 11 detected by the accelerometer 15 and the known length of each section of pipe or tubing 10.

The accelerometer 15 may be mounted in one of the arms 14 used to centralise the probe 13 as it moves up/down the borehole, or it may be installed in the probe itself.

Referring now to FIG. 6 of the drawings, the output signal of the sensor 15 is fed into a processing circuit 17 which produces a signal representative of path length from the number of joints detected and the known length of each section of drillpipe or tubular string. The signal representative of path length is then combined with data provided by an inertial navigation system 18 mounted in the probe using a Kalman filter 19 to bound or reduce the errors in data provided by the inertial navigation system. In essence the Kalman filter 19, is a statistical weighting and error propagation device.

The main functional components of the filter are shown in FIG. 6. The difference between the IN system estimates of well depth and the path length signal provided by the sensor forms the input to the filter, usually referred to as the 'measurement'. This is compared with an estimate of the same quantity generated using an analytical model of the measurement process 21. The measurement model is formed based upon dynamic models of the error processes within the IN system 20 and errors in the depth measurement process. The resulting measurement difference is multiplied by a set of gains 22 to form updates to the IN error model. The effect of the feedback process within the filter is to update the error model until the measurement difference converges to a null, at which time the IN error estimates generated within the filter may reasonably be expected to resemble closely the actual errors in the IN system. These error estimates may therefore be used to correct both the actual IN system and the IN error model via a reset controller 23.

Effectively, estimates of the IN, system errors are formed by taking a weighted mean of the measurement and the output of the filter measurement model. The filter gains reflect the relative weighting factors. Specifically, in a Kalman filter, these gains are selected in an 'optional' manner in order to minimise the variances of the errors in the model.

FIG. 8 shows the main functional blocks of a strapdown inertial navigation system of the type which may be used in the context of this invention. This system comprises a sensor block 25, containing a triad of linear accelerometers 26 and rate gyroscopes 27, together with a signal processor 28 in which the navigation computation is implemented. This computation involves the processing of the gyroscope signals 29 which represent the angular rates of the probe to determine the attitude and heading of the accelerometer triad in the chosen navigation reference coordinate frame, which will typically be coincident with the directions of true north, east and the local vertical. This information is used to resolve the accelerometer measurements into the reference frame 30. The resolved accelerations form inputs to the navigation computation 31 in which these signal are combined with knowledge of the local gravity vector 32 and Coriolis corrections 33 to compute velocity and position of the probe with respect to an Earth fixed reference frame.

FIG. 8 also shows the inertial navigation system update signals generated by the Kalman filter 34 which are to be used to correct the IN estimates of position, velocity and attitude as well as the measurements provided by the gyroscopes and the accelerometers.

The sensor, indicated in FIGS. 1 and 2, need not necessarily be the form of an accelerometer 15. It could, for example, alternatively be in the form of a magnetic field sensing device, such as a magnetometer 15a (see FIG. 2). As the magnetometer moves past a discontinuity 23 at tube joint 11, the magnetic flux path will change or become distorted by the metallic structure and stress at the joint and so give rise to a change in reluctance thereby modifying the magnetic signature sensed by the instrument.

Referring now to FIG. 3, two sensors 24, typically magnetometers, are mounted a known distance D apart in the probe 13. The elapsed time $t_2-t_1$ between successive changes in magnetic signature (see FIG. 4) sensed by the two sensors 24 is measured and from this it is possible to deduce the, speed of the probe 13 in the downhole tubular by simply-dividing the sensor separation by the measurement of elapsed time. A check on the velocity measure may be obtained by using an additional magnetometer 24a, installed a known distance from the other similar devices.

An alternative method by which estimates of probe velocity with respect to the downhole tubular may be determined involves the use of two or more pressure sensors mounted a known distance apart along the probe. Typical output signals of two such sensors are shown in FIG. 5. Assuming the medium through which the probe is moving is ideally homogenous, then a measure of the elapsed time $t_2-t_1$ between successive readings of the same pressure $P_1$ will enable an estimate of velocity to be obtained by dividing the sensor separation by the measurement of elapsed time. It should be noted that this technique cannot be applied in high angle applications, because there will be no significant or measurable hydrostatic pressure difference between the two sensors.

As shown in FIG. 7 the probe velocity determined by the two sensors 24 is combined with an estimate of velocity generated by the inertial navigation system using a Kalman filter 19.

The filter proposed here is similar in configuration to the depth update filter described with reference to FIG. 6. However it should be noted that velocity updates alone cannot remove position errors. Whilst velocity updates will minimise the build-up of position errors, initial position errors will remain after the application of the velocity updates.

The sensor, indicated in FIGS. 1 and 2 could also be replaced by a flow measuring device, such as an impeller, which, assuming the medium through which the probe is moving is homogenous, will measure the velocity of the probe (or tool) through the drillpipe or tubular string.

In general, the above embodiments relate to the use of strapdown or platform inertial navigational systems for borehole surveying and are applicable to systems incorporating conventional spinning mass gyroscopes, optical or vibratory gyroscopes and solid state, micro-machined, sensors.

The above embodiments are given by way of example only and various modifications will be apparent to persons skilled in the art without departing from the scope of the present invention.

What is claimed is:

1. A method of surveying a borehole containing sections of a tubular string utilizing a survey probe, the method comprising:

mounting an inertial navigational system on the probe, the inertial navigation system including a plurality of gyroscopes and a plurality of accelerometers;

generating a set of navigational data from the plurality of gyroscopes and the plurality of accelerometers indicative of the three dimensional probe position, velocity and attitude relative to the earth as the probe moves through the borehole;

having a probe mounted sensor for detecting joints a number of successive between the sections of the tubular string within the borehole;

using paid sensor for determining a path length along the borehole from a known reference point to the probe as a function of the number of joints detected; and as the probe moves through the borehole, altering the navigational data as a function of the determined path length to reduce errors in the navigational data provided by the inertial navigational system.

2. The method as defined in claim 1, wherein detecting joints between the sections of the tubular string comprises sensing physical discontinuities along the tubular string indicative of the joints between the sections of the tubular string.

3. The method as defined in claim 1, wherein detecting joints between the sections of the tubular string comprises sensing magnetic flux changes indicative of the joints between the sections of the tubular string.

4. The method as defined in claim 1, further comprising:

mounting two sensors on the probe spaced apart axially a known distance, each of the two sensors detecting joints between the sections of the tubular string;

determining a probe velocity while the probe moves through the tubular string as a function of the elapsed time between each of the two sensors detecting the same joint between the sections of the tubular string; and as a probe moves through the borehole, altering the navigational data as a function of the determined probe velocity to reduce errors in the navigational data provided by the inertial navigational system.

5. The method as defined in claim 1, further comprising:

mounting two sensors on the probe spaced apart axially a known distance, each of the two sensors detecting a fluid pressure in the tubular string;

determining a probe velocity while the probe moves through the tubular string as a function of the elapsed time between each of the two sensors detecting the same fluid pressure in the tubular string; and as a probe moves through the borehole, altering the navigational data as a function of the determined probe velocity to reduce errors in the navigational data provided by the inertial navigation system.

6. The method as defined in claim 1, further comprising:

mounting a flow measuring device on the probe;

determining a probe velocity while the probe moves through the tubular string as a function of the flow measuring device; and as the probe moves through the borehole, altering the navigational data is a function of the determined probe velocity to reduce errors in the navigational data provided by the inertial navigational system.

7. A borehole survey apparatus for providing navigational data representative of the position of a probe moving within the borehole containing sections of a tubular string, the borehole survey apparatus comprising:

an inertial navigation system mounted on the probe, the inertial navigation system including a plurality of gyroscopes and a plurality of accelerometers for outputting a set of navigational data indicative of the three dimensional probe position, velocity and attitude relative to the earth as the probe moves through the borehole;

a sensor mounted on the probe for detecting a number of successive joints between the sections of the tubular string within the borehole; and a signal processor mounted on the probe for receiving signals from said sensor and outputting a path length signal from a known reference point to the probe as a function of the number of joints detected by the sensor and altering the navigational data as the probe moves through the borehole as a function of the path length signal to reduce errors in the navigational data provided by the inertial navigation system.

8. The borehole survey apparatus as defined in claim 7, wherein the sensor is an accelerometer for sensing discontinuities along the tubular string indicative of the joints between the sections of the tubular string.

9. The borehole survey apparatus as defined in claim 7, wherein the sensor is a magnetic field sensing device for sensing changes in magnetic flux indicative of the joints along the tubular string between the sections of the tubular string.

10. The borehole survey apparatus as defined in claim 7, further comprising:

two sensors mounted on the probe and spaced axially apart a known distance, each of the two sensors detecting joints between the sections of the tubular string; and the signal processor determining probe velocity while the probe moves through the tubular string as a function of the elapsed time between each of the two sensors detecting the same joint between the sections of the tubular string, and altering the navigational data as a function of the determined probe velocity to reduce errors in the navigational data provided by the inertial navigation system.

11. The borehole survey apparatus as defined in claim 7, further comprising:

two sensors mounted on the probe and spaced axially apart a known distance for detecting a fluid pressure in the tubular string; and the signal processor determining a probe velocity while the probe moves through the tubular string as a function of the elapsed time between each of the two sensors detecting the same fluid pressure in the tubular string, and altering the navigational data as a function of the determined probe velocity to reduce errors in the navigational data provided by the inertial navigation system.

12. The borehole survey apparatus as defined in claim 7, further comprising:

a flow measuring device mounted on the probe; and the signal processor determining probe velocity while the probe moves through the tubular string as a function of a flow measuring signal from the flow measuring device, and altering the navigational data as a function of the determined probe velocity to reduce errors in the navigational data provided by the inertial navigation system.

13. The borehole survey apparatus as defined in claim 12, wherein the flow measuring device is an impeller.

* * * * *

UNITED STATES PATENT AND TRADEMARK OFFICE
CERTIFICATE OF CORRECTION

PATENT NO. : 6,145,378
DATED : November 14, 2000
INVENTOR(S) : David P. McRobbie and John L. Weston It is certified that error appears in the above-identified patent and that said Letters Patent are hereby corrected as shown below:

In Column 6, line 54, "generating a set of navigational" should read --generating navigational --.

In Column 6, line 61, "detecting joints a number of successive between" should read --detecting a number of successive joints between--.

In Column 7, line 55 , "outputting a set of navigational data" should read --outputting navigational data--.

Signed and Sealed this

Eighth Day of May, 2001

Attest:

NICHOLAS P. GODICI

Attesting Officer

Acting Director of the United States Patent and Trademark Office